United States Patent [19]

Schmidle

[11] 4,377,679

[45] Mar. 22, 1983

[54] PHOTOCURABLE COMPOSITIONS BASED ON ACRYLATE POLYESTER URETHANES

[75] Inventor: Claude J. Schmidle, Trenton, N.J.

[73] Assignee: Thiokol Corporation, Newtown, Pa.

[21] Appl. No.: 343,659

[22] Filed: Jan. 28, 1982

[51] Int. Cl.³ ............... C08G 18/68; C08G 18/34; C08G 18/00; C08F 8/00

[52] U.S. Cl. ............... 528/75; 204/159.14; 204/159.15; 204/159.19; 252/182; 252/188.3 R

[58] Field of Search ............ 528/75; 204/159.19; 252/182, 188.3

[56] References Cited

U.S. PATENT DOCUMENTS

| | | | |
|---|---|---|---|
| 3,759,809 | 9/1973 | Carlick et al. | 204/159.15 |
| 4,064,194 | 12/1977 | Evans et al. | 528/75 |
| 4,145,511 | 3/1979 | Gilles | 528/75 |

Primary Examiner—H. S. Cockeram

Attorney, Agent, or Firm—Richard J. Sheridan; Gerald K. White

[57] ABSTRACT

Provided are processes for preparing compositions useful in photopolymerizable compositions, which processes comprise:
A. reacting a polyether diol and an acrylic acid in about equal molar proportions; and
B.
 1. reacting a polyether diol and an acrylic acid in about equal molar proportions and
 2. reacting the product of step B1, a hydroxyalkylacrylate and an organic diisocyanate in about equal molar proportions.

Also provided are the products of these processes. These products are useful in photopolymerizable compositions which may typically contain, in addition to said products, N-vinyl-2-pyrrolidone and a photoinitiator.

9 Claims, No Drawings

PHOTOCURABLE COMPOSITIONS BASED ON ACRYLATE POLYESTER URETHANES

BACKGROUND OF THE INVENTION

Compositions which polymerize when exposed to light or other forms of radiation have become increasingly useful and popular in the field of coatings for various substrates. Such photopolymerizable coating compositions have several advantages over coatings which must either be applied in molten form or as a solution in a suitable solvent followed by removal of the solvent. Since the photopolymerizable compositions do not require heating, either in their application or in a drying process, they can provide substantial energy savings. Likewise, since they do not require solvent removal, pollution problems can be minimized.

SUMMARY OF THE INVENTION

This invention relates to processes for preparing compositions which are useful in photopolymerizable compositions and the products of such processes. More particularly, the processes of this invention comprise Process A reacting a polyether diol and an acrylic acid in about equal molar proportions, and Process B 1. reacting a polyether diol and an acrylic acid in about equal molar proportions; and 2. reacting the product of step 1, a hydroxyalkyl acrylate and an organic diisocyanate in about equal molar proportions.

The compositions produced by the processes of this invention are particularly useful in photopolymerizable compositions which require relatively low viscosity, such as in coating compositions which must have the ability to flow readily and uniformly over the surface of a substrate. Generally, the photopolymerizable compositions prepared from the compositions produced by the processes of this invention will have viscosities below about 50 poise, preferably in the range of about 20 to about 50 poise. Such photopolymerizable compositions also possess excellent stability at elevated temperatures, e.g. up to about 70° C., and good flexibility when cured.

DESCRIPTION OF THE PREFERRED EMBODIMENTS

The processes of this invention comprise:

Process 1 reacting a polyether diol and an acrylic acid in about equal molar proportions, and Process 2

A. reacting a polyether diol and an acrylic acid in about equal molar proportions; and B. reacting the product of step A, a hydroxyalkyl acrylate and an organic diisocyanate in about equal molar proportions.

The polyether diols useful in the processes of this invention are polymers whose backbones contain the repeating units $+R-O+$ where R is alkylene, and have free hydroxyl groups attached to their terminal repeating unit, i.e. the polymers are terminated at each end by a —R—OH group. The hydroxyl group may be a primary or secondary hydroxyl, although the primary hydroxyl groups are preferred. The polyether diols are preferably hydroxy-terminated polypropylene glycols having molecular weights in the 400–800 range and having Hydroxyl Nos. from about 145 to about 265. Examples of the polyether diols include, but are not limited to, hydroxy-terminated adducts of propylene oxide to dipropylene glycol having an average molecular weight of about 425 and a Hydroxyl No. of about 263 (NIAX PPG 425, sold by Union Carbide Corp.), hydroxy-terminated adducts of propylene oxide to dipropylene glycol having an average molecular weight of about 725 and a Hydroxyl No. of about 147, (NIAX PPG 725, sold by Union Carbide Corp.), polypropylene glycol end-capped with ethylene oxide groups and having an average molecular weight of about 650 and an Hydroxy No. of about 173 (POLYG 55-173, sold by Olin Corp.), polypropylene glycol end-capped with ethylene oxide and having an average molecular weight of about 775 and a Hydroxy No. of about 150, polypropylene glycol end-capped with ethylene oxide and having an average molecular weight of about 425 and a Hydroxyl No. of about 265, and the like. Other useful polyether diols include hydroxy-terminated poly(1,4-butanediol) (derived from tetrahydrofuran) and hydroxy-terminated copolymers of 1,4-butanediol and ethylene oxide. A particularly preferred polyether diol is POLY-G 55-173 which has the formula:

9.38 avg.

(avg. molecular weight approximately 650)

The acrylic acids useful in the processes of this invention include acrylic acid and alkyl acrylic acids such as methacrylic acid and the like. As used herein the phrase "an acrylic acid" is intended to represent both acrylic acid and the alkyl acrylic acids.

The hydroxyalkyl acrylates which may be used in the processes of this invention are compounds having the formula:

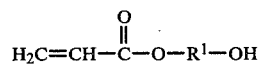

where $R^1$ is $C_2$ to $C_3$ alkylene. Examples of the hyroxyalkyl acrylates include, but are not limited to, 2-hydroxyethyl acrylate, 2-hydroxypropyl acrylate and the like. 2-hydroxyethyl acrylate is particularly preferred.

The organic diisocyanates used in the processes of this invention have the formula:

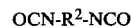

where $R^2$ is a divalent, organic radical such as alkylene, arylene, alkarylene or aralkylene. Examples of organic diisocyanates useful in this invention include, but are not limited to, isophorone diisocyanate; 2,4-tolylene diisocyanate; 2,6-tolylene diisocyanate; hexamethylene diisocyanate; trimethyl hexamethylene diisocyanate; dicyclohexylmethane diisocyanate and the like. The preferred diisocyanates are the aliphatic diisocyanates which impart improved properties such as light stability, stain resistance and flexibility to the cured photopolymerizable compositions made from them.

The following reaction schemes illustrate the processes of this invention:

Process 1.0 HOCH$_2$CH$_2$O$-$(CH$_2$CH$_2$CH$_2$O)$_{\overline{n}}$CH$_2$CH$_2$OH + 1.0 CH$_2$=CHCOOH Polyether diol | acrylic acid
↓

0.50 CH$_2$=CHCOOCH$_2$CH$_2$O$-$(CH$_2$CH$_2$CH$_2$O)$_{\overline{n}}$CH$_2$CH$_2$OH +

Hemi-acrylate 0.25 CH$_2$=CHCOOCH$_2$CH$_2$O$-$(CH$_2$CH$_2$CH$_2$O)$_{\overline{n}}$CH$_2$CH$_2$OOCCH=CH$_2$ +

Di-acrylate 0.25 HOCH$_2$CH$_2$O$-$(CH$_2$CH$_2$CH$_2$O)$_{\overline{n}}$CH$_2$CH$_2$OH Polyether diol The above reaction scheme illustrates a typical composition produced when a polyether diol and acrylic acid are reacted in about equal molar proportions. The reaction depicted is based on a statistical approximation, assuming the hydroxyl groups are equally reactive. It is estimated that the product contains about 50% Hemi-acrylate, about 27% Di-acrylate and about 23% Polyether diol.

In Process 2, the product of the above reaction is further reacted with a hydroxyalkyl acrylate acid and an organic diisocyanate as illustrated below.

uct may then be shaken with a 20% Na$_2$CO$_3$ solution until the acid number of the product is below about 1.0.

In Process 2, the product of Process 1, a hydroxyalkyl acrylate and an organic diisocyanate are blended together in a suitable vessel. More preferably the product of Process 1 and the hydroxyalkyl acrylate are blended together and the organic diisocyanate is added slowly over the course of the reaction. (This slow addition of the organic diisocyanate prevents premature or possibly violent reaction of the reaction mixture.) Also blended into the reaction mixture are an effective Process 2

CH$_2$=CHCOOCH$_2$CH$_2$—X—CH$_2$CH$_2$OH + CH$_2$=CHCOOCH$_2$CH$_2$—X—CH$_2$CH$_2$OOCCH=CH$_2$ +

Hemi-acrylate　　　　　　　　　　　Di-acrylate

HOCH$_2$CH$_2$—X—CH$_2$CH$_2$OH + CH$_2$=CHCOOR$^1$OH + OCN—R$^2$—NCO

Polyether diol　　　　hydroxyalkyl　　　organic
　　　　　　　　　　　acrylate　　　　diisocyanate $$CH_2=CHCOOCH_2CH_2-X-CH_2CH_2O\overset{O}{\overset{\|}{C}}NH-R^2-NH\overset{O}{\overset{\|}{C}}OCH_2CH_2-X-CH_2CH_2OOCCH=CH_2 +$$

CH$_2$=CHCOOCH$_2$CH$_2$—X—CH$_2$CH$_2$OOCCH=CH$_2$ +

$$HOCH_2CH_2-X-CH_2CH_2O\overset{O}{\overset{\|}{C}}NH-R^2-NH\overset{O}{\overset{\|}{C}}OCH_2CH_2-X-CH_2CH_2OH +$$

$$CH_2=CHCOOR^1O\overset{O}{\overset{\|}{C}}NH-R^2-NH\overset{O}{\overset{\|}{C}}OR^1OOCCH=CH_2$$

where X represents the polyether backbone of the Polyether diol.

It will be apparent to one skilled in the art that other side reactions may occur which are not illustrated above. Thus, it should be emphasized that the above reaction scheme is presented for illustrative purposes only and is not intended to limit this invention in any manner.

The reaction of the polyether diol and an acrylic acid (Process 1) may be carried out by mixing the polyether diol and acrylic acid in any suitable vessel together with an effective amount of catalyst, e.g. methane sulfonic acid, sulfuric acid, toluene sulfonic acid and the like, and a polymerization inhibitor such as, for example, phenothiazine, MEHQ and the like. The resulting reaction mixture is then heated, preferably at reflux temperature to remove water formed during the reaction, until the acrylation is complete. The resulting reaction prodamount of catalyst, e.g. dibutyl tin dilaurate, and, if desired, additional polymerization inhibitor (the total amount of polymerization inhibitor in Process 2, whether carried over from Process 1 or added during Process 2 should be about 75–300 ppm). The reaction may be conducted under an inert atmosphere, e.g. nitrogen, if desired. The reaction is begun by heating the reaction mixture to about 60° C. to about 90° C., preferably about 60° C. to about 70° C., and such hearing is maintained until the isocyanate content of the reaction mixture drops to about 1.0% or less.

The compositions produced by the processes of this invention generally have viscosities in the range of about 20 to about 30 poise, preferrably about 25 poise, and average molecular weights of less than about 1500.

The compositions produced by the processes of this invention may be employed in photopolymerizable compositions, i.e. compositions which are capable of polymerizing or curing upon exposure to actinic radiation, e.g. ultraviolet radiation or electron beam. Generally, they may be blended in any convenient manner with the other ingredients commonly employed in such photopolymerizable compositions. Thus, for example, the photopolymerizable composition may contain the composition of this invention, a photoinitiator, a polymerization inhibitor and other additives as may be desirable.

The preparation of the compositions of this invention is illustrated by the following examples in which all parts are by weight unless otherwise indicated.

EXAMPLE 1

To a suitable vessel fitted with a drop funnel, thermometer and condenser is added 1287.6 g of a polyether diol which is a hydroxy-terminated adduct of propylene oxide to dipropylene glycol having an average molecular weight of about 725 and a Hydroxy No. of about 147 (NIAX PPG 725, sold by Union Carbide Corp.), 3.32 g of methane sulfonic acid catalyst, 0.25 g phenothiazine and 351.45 g toluene. The resulting mixture is heated to about 68° C. and 144.12 g of acrylic acid is added to the vessel via the drop funnel over a period of about 1 hour during which time the temperature of the mixture rises to about 124° C. About 100 cc of toluene is added to the mixture and a slow reflux is begun. The reflux is maintained for a period of time sufficient to remove water which is formed during the reaction. When the reaction is completed the resulting product is shaken with a 20% solution of $Na_2CO_3$ until the acid number of the mixture is below about 1.0. The product is recovered by filtering and removing the toluene by distillation.

EXAMPLE 2

To a 2 liter, 4 neck round bottom flask equipped with a stirrer, condenser, thermometer, $N_2$ inlet and condenser are added 500 g of the product of Example 1, 88 g 2-hydroxyethyl acrylate, and 0.12 g dibutyl tin dilaurate. The mixture is stirred, blanketed with $N_2$ and slowly heated to about 60° C. for about 1 hour during which time 201 g of dicyclohexyl methane diisocyanate is added to the reaction mixture. Heating is maintained for an additional 1.5 hours. The reaction mixture is analyzed periodically for isocyanate content (by titration with amine) and the reaction is continued until the isocyanate content drops to about 1–1.1%. The resulting product has a density of 1.11 and a viscosity of 26.1 poises.

EXAMPLE 3

A photopolymerizable composition is prepared by blending together 70 parts of the product of Example 1, 15 parts of N-vinyl-2-pyrrolidone, and 4 parts of a photoinitiator (CG 184 sold by Ciba Geigy). The resulting composition is coated onto polycarbonate, paper and primed aluminum substrates and exposed under a nitrogen atmosphere by a mercury lamp in a Radiation Polymer Company processor at a rate of about 20 feet per minute. The coating cures completely and has excellent physical properties.

EXAMPLE 4

A photopolymerizable composition is prepared by blending together 70 parts of the product of Example 2, 15 parts of N-vinyl-2-pyrrolidone, and 2 parts of a photoinitiator (CG 184 sold by Ciba Geigy). The composition is coated onto paper and polycarbonate substrates and exposed under air atmosphere by a mercury lamp in a Radiation Polymer Company processor. The composition is also coated onto a primed aluminum substrate and exposed in the same manner except that a nitrogen atmosphere is employed. All coatings cure completely and have excellent physical properties.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What I claim and desire to protect by Letters Patent is:

1. A process for preparing compositions for use in photopolymerizable compositions comprising:
   A. reacting a polyether diol and an acrylic acid in about equal molar proportions, and
   B. reacting the product of step A, a hydroxyalkyl acrylate and an organic diisocyanate in about equal molar proportions.

2. The process of claim 1 wherein the polyether diol is a polypropylene glycol diol.

3. The process of claim 1 wherein the acrylic acid is acrylic acid.

4. The process of claim 1 wherein the polyether diol is a polypropylene glycol end-capped with ethylene oxide.

5. The process of claim 4 wherein the polypropylene glycol has the average formula:

9.38 avg.

6. The process of claim 1 wherein the hydroxyalkyl acrylate is selected from 2-hydroxyethyl acrylate and 2-hydroxypropyl acrylate.

7. The process of claim 1 wherein the organic diisocyanate is an aliphatic diisocyanate.

8. The process of claim 1 wherein the organic diisocyanate is selected from isophorone diisocyanate; 2,4-tolylene diisocyanate; 2,6-tolylene diisocyanate; hexamethylene diisocyanate; trimethyl hexamethylene diisocyanate and dicyclohexylmethane diisocyanate.

9. The product made by the process of claim 1.

UNITED STATES PATENT AND TRADEMARK OFFICE
CERTIFICATE OF CORRECTION

PATENT NO. : 4,377,679
DATED : Mar. 22, 1983
INVENTOR(S) : Claude J. Schmidle

It is certified that error appears in the above-identified patent and that said Letters Patent is hereby corrected as shown below:

Column 1, line 25, "Process A" should be -Process 1-.

Column 1, line 28, "Process B" should be -Process 2-.

Column 1, line 29, numeral "1" should be letter -A-.

Column 1, line 31, numeral "2" should be letter -B-.

Column 2, line 56, after "divalent" delete the comma -,-.

Column 5, line 5, "electron" should be -election-.

Column 6, line 15, "have" should be -has-.

Signed and Sealed this

Eighteenth Day of February, 1992

Attest:

HARRY F. MANBECK, JR.

*Attesting Officer*          *Commissioner of Patents and Trademarks*